United States Patent [19]

Tomii et al.

[11] 4,183,053
[45] Jan. 8, 1980

[54] PROJECTION TYPE COLOR TELEVISION WITH A SINGLE CATHODE RAY TUBE

[75] Inventors: Kaoru Tomii; Tadao Kohashi, both of Kawasaki, Japan

[73] Assignee: Matsushita Electric Industrial Company, Limited, Japan

[21] Appl. No.: 858,838

[22] Filed: Dec. 8, 1977

[30] Foreign Application Priority Data

Dec. 10, 1976 [JP] Japan .................... 51/149186

[51] Int. Cl.² .............................................. H04N 9/24
[52] U.S. Cl. ....................... 358/60; 358/67; 358/69
[58] Field of Search .................. 358/60, 64, 66, 65, 358/68, 69, 67

[56] References Cited

U.S. PATENT DOCUMENTS 3,086,076  4/1963  Harries ........................ 358/60

Primary Examiner—Robert L. Richardson
Attorney, Agent, or Firm—Lowe, King, Price & Becker

[57] ABSTRACT

Two electron beams are used to scan a striped color phosphor pattern arranged normal to the scan line in succession so as to increase the total amount of photon emission during the interval between successive line scans. The two beams are oscillated parallel to the scan line so as to increase the dwell time of impinging electrons on the phosphor stripe with a consequential increment in brightness. Beam sensing elements are located in a predetermined positional relationship with the phosphor stripes. Impingement of the scanning beams upon the sensing elements produces an index signal representing the nonlinearity which may be present in the horizontal deflection waveform, which signal is stored for the interval of a subsequent raster scan and retrieved nondestructively at the start of each line scan. The retrieved signal is modulated in frequency with a signal representing the time it takes for the beam to traverse the entire phosphor stripes to compensate for the so-called pincushion distortion. The frequency-modulated index signal is delayed so as to align it in phase with the start of each line scan. The phase-corrected index signal is used to sample a received primary color components in succession to provide a dot-sequential signal which is used to modulate the first beam. A predetermined delay time is introduced to the dot-sequential signal prior to the modulation of the second beam. Second beam sensing elements are located parallel to the phosphor stripes. Impingement of the scanning beams upon the sensing stripes results in two start-of-line index signals which are discriminated from each other by modulating the second beam with a pilot signal. The discriminated signals are compared in phase to compensate for a delay time error which may have been introduced to the intensity modulation of the second beam.

16 Claims, 9 Drawing Figures

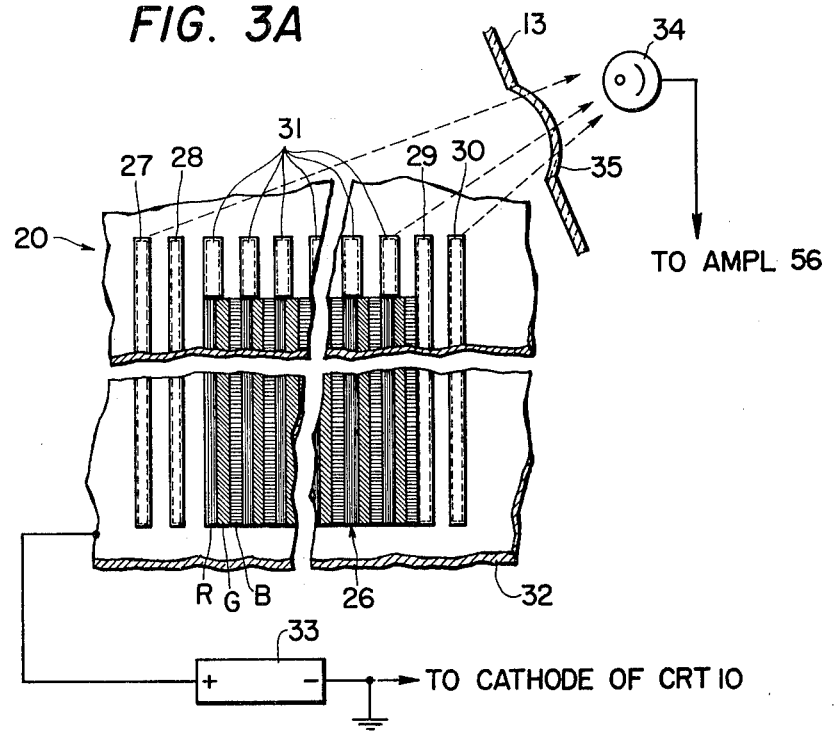
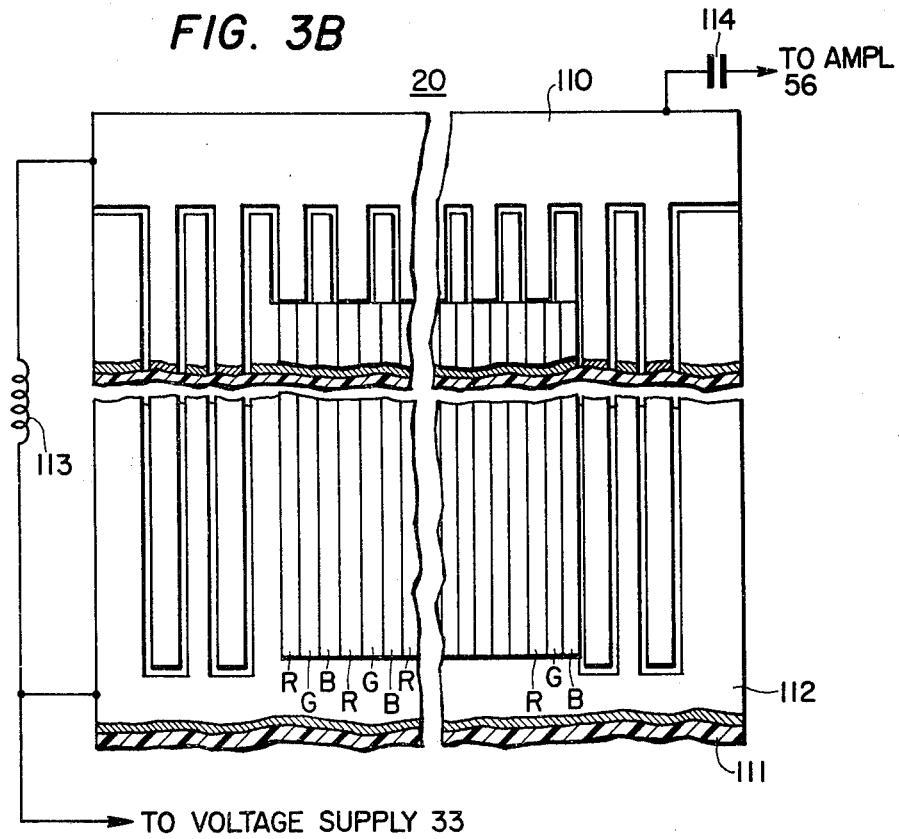

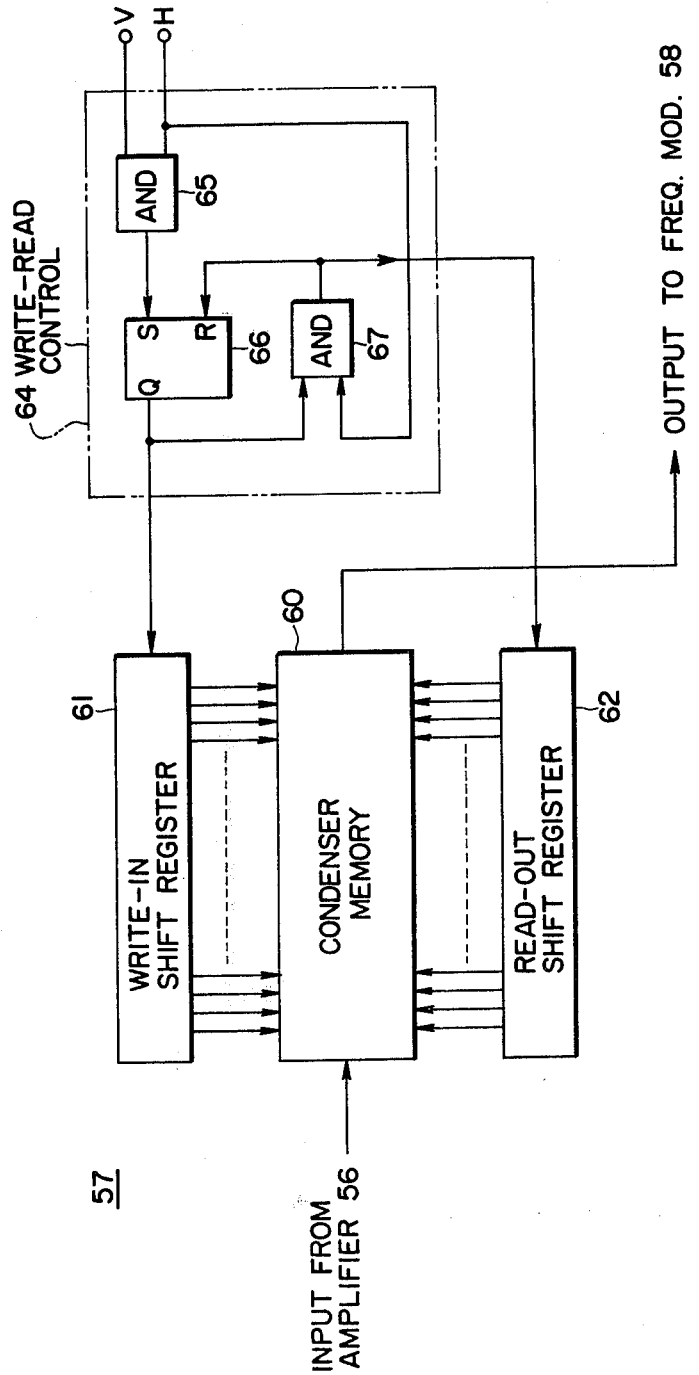

PROJECTION TYPE COLOR TELEVISION WITH A SINGLE CATHODE RAY TUBE

BACKGROUND OF THE INVENTION

This invention relates to projection type television viewing systems, and particularly to such systems employing a single cathode ray tube. The invention more particularly relates to apparatus for increasing the image brightness and controlling the orientation of the beam spot in the cathode ray tube.

In conventional projection type television viewing systems three cathode ray tubes are employed each providing an image of a different primary color for projection onto a large screen where the images blend into a composite color image. Although the brightness level of the composite image is satisfactory, the separate color images must be accurately in registry with each other. However, the registration problem is difficult to solve because of instability in the performance of the individual image forming systems.

SUMMARY OF THE INVENTION

The present invention contemplates the use of recurrent groups of successively arranged phosphor stripes emissive of different primary colors in response to electron impingement. The phosphor stripes are disposed within an image area of a target surface. Index signal generating means is provided which comprises a plurality of electron impingement sensors located adjacent to but outside of the image area with a predetermined positional relationship with the phosphor stripes. The index signal is generated in response to the electron scanning during an interval between successive raster scans to represent the nonlinearity of the horizontal deflection waveform and stored for an interval of a raster. The stored information is retrieved at the beginning of each line scan for beam orientation purposes. The location of the index signal generating means outside of the image area allows the phosphor stripes to be closely spaced so that a high resolution image can be provided.

The brightness of an image can be increased simply by increasing the beam current. However, the increased beam current tends to produce an enlarged beam spot which may overlie adjacent ones of the closely spaced phosphor stripes. In some cases, the color saturation level will be reached, and a further increase in the beam current will result in a loss of color purity.

To increase the brightness two electron guns are employed for providing a pair of substantially parallel beams which produce two beam spots vertically spaced apart a predetermined distance, or an integral multiple of the line width. The two beams are caused to successively scan the phosphor stripes with an interval which is an integral multiple of a line scan period so that the same spot of the stripe is bombarded with the same primary color component. The beam intensity modulation is such that the impingement of the first electron beam produces a light intensity not exceeding the color saturation point of the phosphor material and the impingement of the second beam on the same spot gives a complementary effect on the decaying phosphorescence. The result is an increase in the total amount of photons emitted during the interval between successive line scans.

The brightness level can be further increased by oscillating the two electron beams in the horizontal direction in response to a signal derived from the frequency-modulated, phase-corrected first index signal. Preferably, the waveform of the signal is a bipolar sawtooth shape with the inclination of the voltage slope being reverse to that of the horizontal deflection waveform, so that the beam stays on the same spot for a longer time than it takes to shift to the next. This makes full use of the electron beam energy and serves to further increase the brightness level.

For accurate registration of the primary color components with the corresponding phosphor stripes, the retrieved index signal is modulated in frequency with a signal representative of the time it takes for the electron beam to traverse the image area during each line scan to compensate for the so-called pincushion distortion. This signal is generated in response to electron impingement at the start of each line scan from a second index signal generating means which comprises a plurality of electron impingement sensing, vertically oriented horizontally spaced apart stripes located adjacent to but outside of the image area. This frequency-modulated first index signal is delayed by means of a variable delay circuit in response to a phase difference between it and the second index signal. The phase corrected index signal is then used to sample a received video signal to generate a dot-sequential primary color signal which is used for intensity modulation of the first electron beam. At the same time the dot-sequential signal is delayed for an integral multiple of the line scan period prior to the intensity modulation of the second electron beam therewith.

A convergence control may be necessary to maintain the two separate beams in correct positions relative to each other if an appreciable degree of error exists in the delay time introduced in the second electron beam for successive scansion. This problem can be obviated by introducing a pilot signal to the delayed dot-sequential signal at the start of each line scan. This signal is a burst of a frequency differing from the fundamental frequency of the start index signal. The scansion of the second electron beam across the start index stripes results in a modulation of the two frequencies so that the second start index signal resulting from the impingement of the second electron beam has a different frequency from that of the first start index signal resulting from the impingement of the first electron beam. The fundamental frequency component of the second index signal is selected by a bandpass amplifier and compared in phase with that of the first index signal to detect the phase difference between the two signals, which difference signal is used to control the phase of the delayed dot-sequential video signal.

It is therefore a principal object of the invention to provide a projection type television which only requires a single cathode ray display tube without reduction of brightness and loss of color purity.

BRIEF DESCRIPTION OF THE DRAWINGS

FIGS. 3A and 3B, which illustrate sections of a target face of the cathod ray tube of FIG. 1, respectively, show the beam-sensing apparatus of the invention;

FIG. 4 is a block diagram of the storage circuit of FIG. 2 with a relevant external circuit;

DESCRIPTION OF THE PREFERRED EMBODIMENTS

Figure 1:
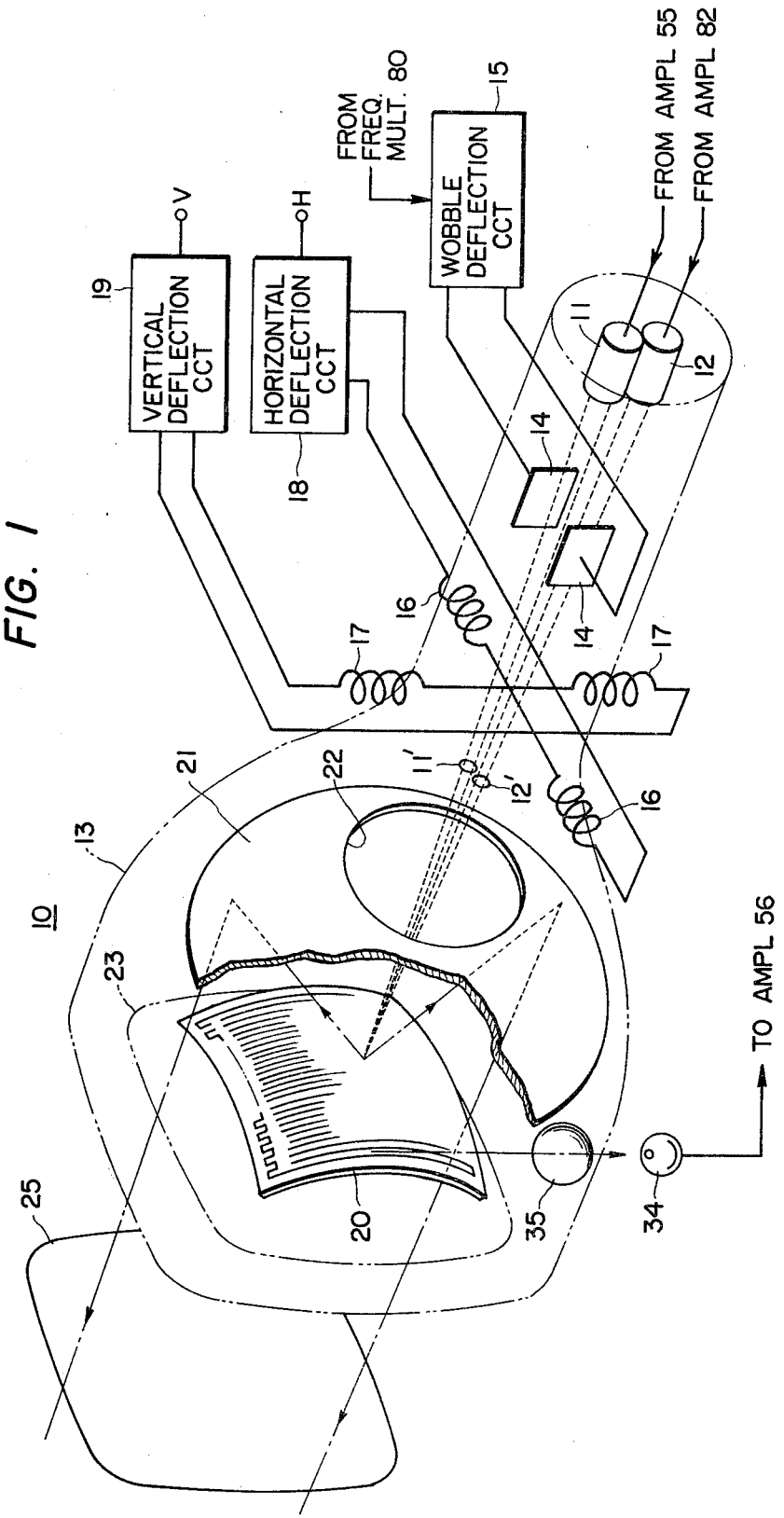
FIG. 1 is a schematic illustration of a cathode ray tube of the present invention.

Referring now to FIG. 1, there is shown a cathode ray tube of the invention for a projection type television receiver. The cathode ray tube 10 includes electron guns 11 and 12 positioned in the neck of an evacuated envelope 13 for providing separate electron beams 11' and 12' The electron guns are preferably disposed in a vertical collinear array. Adjacent to the cathode ray guns 11 and 12 is positioned a pair of horizontally spaced deflection plates 14 which are connected to a wobble deflection circuit 15. Horizontal and vertical deflection coils 16 and 17 are provided in the usual manner, the deflection currents therefor being supplied from horizontal and vertical deflection circuits 18 and 19, respectively. The electron beams are accelerated by a suitable means (not shown) toward the funnel portion of the envelope 13 where a convexed phosphor target 20 is disposed. The beams are deflected by the coils 16 and 17 to form successive rectangular rasters on the convexed surface of the phosphor target. As will be described later, in one embodiment of the invention the phosphor layer is backed by a metal support which is biased at a high positive potential relative to the beam sources in order to attract electrons as well as to reflect back the light when excited by the impinging electrons toward the electron beam side of the tube. In face-to-face relationship with the convexed phosphor target 20 is positioned an apertured concave mirror 21. Through the aperture 22 of the mirror 21 passes each of the electron beams toward the convexed surface of the target so that a convexed image is produced in response to the electron impingement and reflected by the mirror toward a viewing screen (not shown) through an image correcting lens 25 which forms part of a Schmidt projection system.

One embodiment of the phosphor target 20 is illustrated in FIG. 3A as comprising successive groups of light-emissive elements in the form of stripes, the elements of each group being emissive of light of different primary colors in response to electron impingement. Specifically, the reference characters R, G, B identify red, green and blue of the primary, respectively. The phosphor stripes are so arranged that the electron beam traverses them in a direction perpendicular to their length to form a rectangular image region 26 on the target. On the target is also disposed an indexing means, or a plurality of electron impingement sensors adjacent to but outside the image area 26. Each sensor is formed of a material emissive of ultraviolet light in response to electron impingement. Index stripes 27 and 28 form a start indexing electrode which extends along the length of the phosphor stripes adjacent to the left side of the image region 26 where the electron beam is impinged at the start of each line scan. Along the right side of the image area 26 are provided identical stripes 29 and 30 which form an end-of-scan indexing electrode. Disposed between the start and end-of-line indexing electrodes adjacent to the upper side of the image area 26 are indexing stripes 31, each of which are disposed in registry with each group of phosphor stripes or triplet where the electron beam 11' is directed to impinge at the start of each raster scan, or during each vertical blanking interval. The indexing stripes 27, 28, 29 and 30 extend upwardly to form part of the plurality of sensors 31 and are horizontally equally spaced. The phosphor stripes and indexing stripes are disposed on a metal support 32 which is connected to the positive terminal of a DC voltage source 33, the negative terminal of which is connected to the cathode of the electron guns 11, 12, for accelerating electrons to a high velocity. The ultraviolet light emitted from the indexing means is detected by a photo-multiplier 34 through a window 35 provided on the funnel portion of the tube 10. Alternatively, the indexing electrodes may be formed of a material emissive of secondary electrons by electron impingement. In this case, the photo-multiplier 34 is replaced by an electrode disposed in the envelope 13 to collect the secondary electrons.

Figure 2:
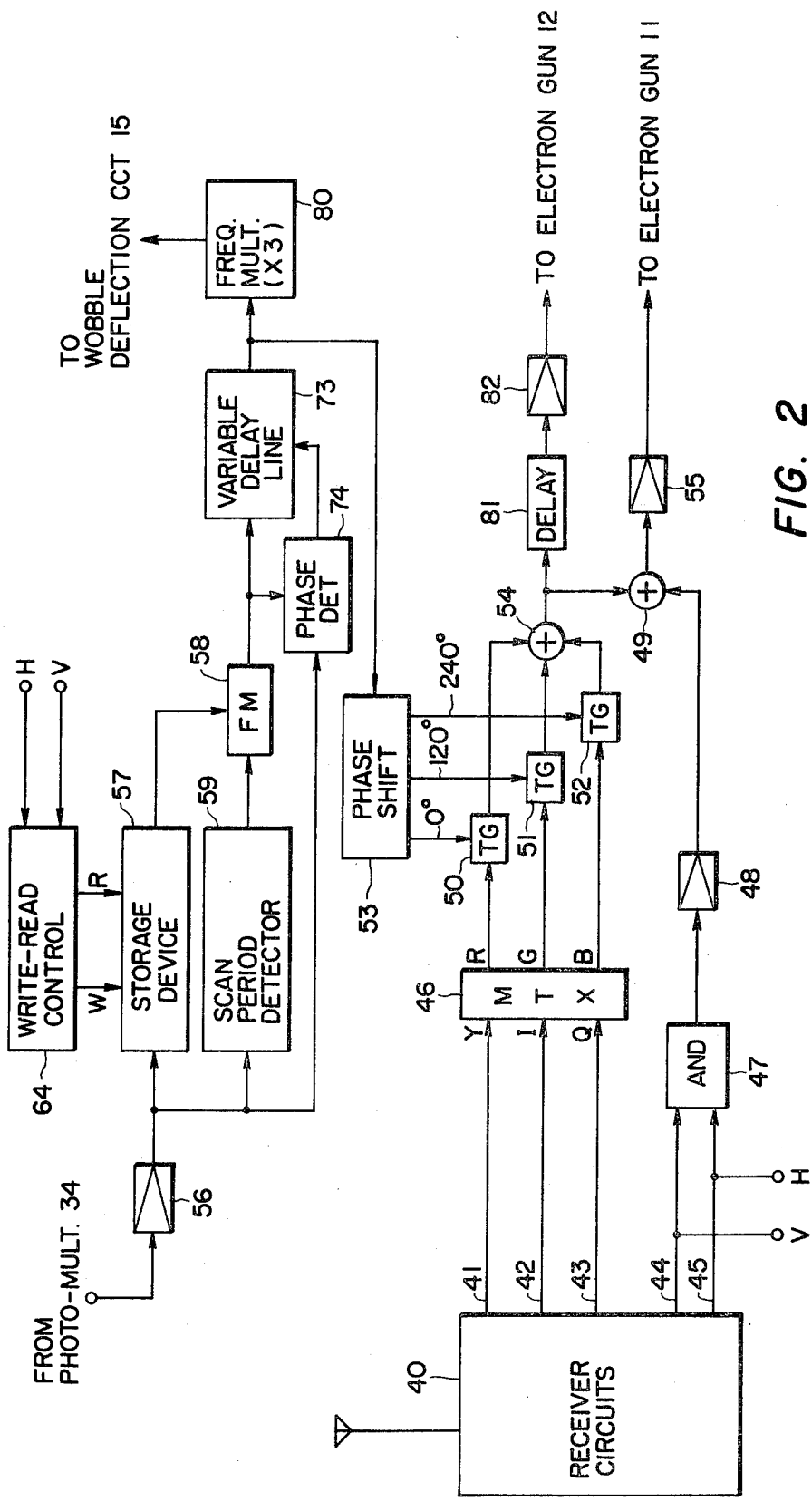
FIG. 2 is a block diagram of a control apparatus embodying the invention.

Referring to FIG. 2, block 40 represents the conventional receiver circuits by which the components of an incoming color television signal are derived. These components comprise the luminance component as identified by Y signal derived at output connection 41, the chrominance component identified by I and Q signals derived at output connections 42 and 43, respectively, the vertical and horizontal deflection synchronization components V and H derived respectively at output connections 44 and 45. The luminance and chrominance components are supplied to a matrix circuit 46 where the input signals are converted into the primary color signals R, G and B. The deflection synchronizing components are supplied to an AND gate 47, the output of which is strengthened by an amplifier 48 and supplied to an adder 49. The output of the AND gate 47 occurs in response to the presence of a horizontal synchronizing pulse during the vertical blanking intervals. The output of the amplifier 48 is at the white level of the video signal so that, as will be understood later, all of the indexing stripes are bombarded by a strongly intensified electron beam during the vertical blanking intervals so as to produce sufficient amount of ultraviolet light to be detected by the photo-multiplier 34.

The primary color signals from the matrix 46 are passed through respective transmission gates 50, 51 and 52 to an adder 54 in response to outputs from a phase shifter 53. As will be described, the outputs from the phase shifter 53 comprise three trains of pulses, the pulses of each train occurring at times displaced by 120° from the pulses of the other trains so that the output of the adder 54 comprises a dot-sequential video signal.

The output from the adder 54 is applied on the one hand to the adder 49 and thence, via an amplifier 55, to the control grid of the electron gun 11 along with the white-level intensification pulse supplied from amplifier 48 to modulate the electron beam 11', and on the other hand to a delay circuit 81. This delay circuit introduces a delay of an integral multiple of a line scan period to the dot-sequential video signal. The delayed signal is amplified at 82 and applied to the control grid of the second electron gun 12. Therefore, the electron beam 12' is intensity-modulated by the delayed primary color signals to impinge on the location of the phosphor stripe where the beam 11' has previously impinged.

Figure 7:
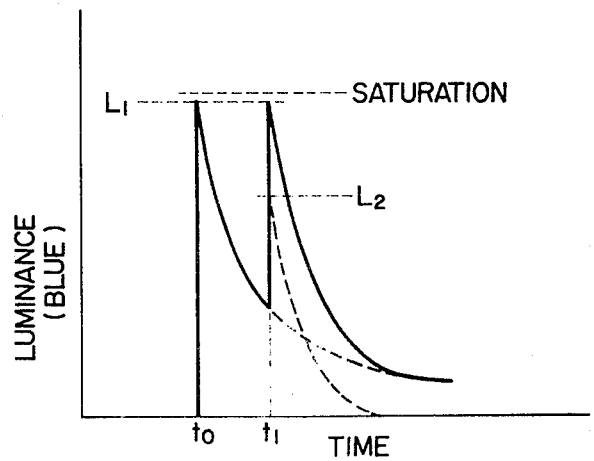
FIG. 7 is a graphic illustration of the phosphor decay characteristic of a given point of a phosphor stripe upon impingement of two successive electron beams.

The electron density or beam current of the electron beam 11' is so adjusted at the amplifier 55 that each phosphor stripe gives off light whose intensity is slightly below the color saturation point of the phosphor material. FIG. 7 illustrates a persistence characteristic of a given point of a phosphor stripe impinged by the electron beams 11' and 12' in succession. At time $t_0$ the electron beam 11' impinges on that given point of the stripe to emit photons at a light intensity level $L_1$ which is slightly below the color saturation level and decreases with time according to the material's persistence characteristic. At time $t_1$ the same point of the stripe is bombarded by the electron beam 12' with an intensity level $L_2$ which is so selected that the combined light intensity at that given point reaches the previous intensity level $L_1$. The successive impingement of electrons with the same primary color signal increases the amount of light, or time integral of photon emission. The relative intensity of the electron beams 11' and 12' and the delay time are so determined as to maximize the total quantity of photons. It is to be noted that this dual-gun, successive electron impingement method can maximize the amount of photons while keeping the beam width to be equal to or smaller than the width of each phosphor stripe. This avoids the problem of mixed colors caused by impingement of an electron beam on adjacent phosphor stripes with a beam width larger than that of the phosphor stripe.

During the vertical blanking intervals all of the indexing stripes are scanned to generate a stream of ultraviolet light pulses and during the successive line scan intervals the start and end-of-scan index electrodes are scanned to generate two ultraviolet light pulses at the start and end of each line scan. The ultraviolet pulses are sensed by the photo-multiplier 34 as an indexing signal and strengthened by an amplifier 56 and fed into a storage device 57 where the signal is stored for as long as the duration of a field or frame raster scan. The stored indexing signal will be read repeatedly at line scan intervals into a frequency modulator 58.

As illustrated in FIG. 4, the storage device 57 comprises a condenser memory 60 which is commercially available from Reticon Corp. as model SAM-128V. A write-in shift register 61 is shown connected to a write-read control circuit 64 which energizes shift register 61 at the start of each raster scan to cause the condenser memory 60 to receive the index signal from amplifier 56. A read-out shift register 62 is shown connected to the control circuit 64 which energizes shift register 62 at the start of each line scan to cause the condenser memory to deliver the stored information nondestructively to frequency modulator 58.

To achieve writing and reading operations, the control circuit 64 includes an AND gate 65 whose input terminals are connected to the vertical and horizontal synchronization terminals V and H to generate a logic "1" output in response to the presence of a horizontal sync pulse during each vertical blanking interval. The output of the AND gate 65 is used to set a flip-flop 66 into a Q output-high condition and at the same time enables an AND gate 67 whose the other input is connected to receive the horizontal sync pulse. The AND gate 67 delivers a logic "1" output to the reset terminal of the flip-flop 66 in response to a horizontal sync pulse which occurs subsequent to the previous sync pulse. Therefore, the flip-flop 66 remains in the high voltage level as long as the electron beam traverses all the the index sensors to enable shift register 61 during that period. The read-out command signal is available at the output AND gate 67.

Since the instantaneous scanning speed of the beam on the target surface differs from point to point along the line path because of inherent nonlinearities in the performance of the deflection systems, the index signal supplied to the frequency modulator 58 represents the instantaneous scanning speed of the electron beam across the target face. In addition, the line scan period differs from one line path to another, it is necessary to detect the time required for the electron beam to traverse the image area 26 for beam orientation purposes.

Figure 5:
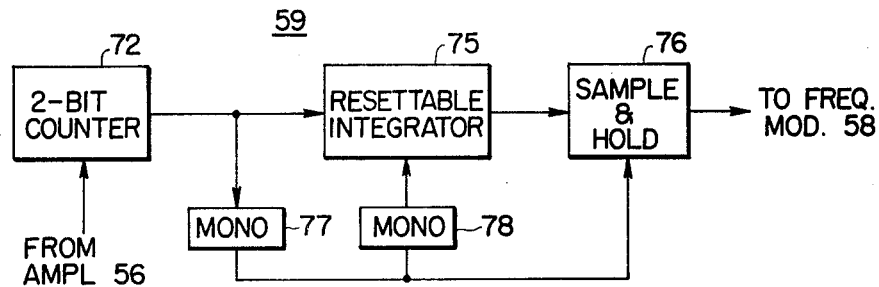
FIG. 5 is an example of the voltage converter of FIG. 2.

To accomplish detection of line scan period, a scan period detector 59 is connected to amplifier 56 to receive the index signals provided by the stripes 27, 28, 29 and 30. In FIG. 5, the scan period detector 59 is shown as comprising a 2-bit binary counter 72, a resettable integrator 75 and a sample-and-hold circuit 76, all of which are connected in series between the amplifier 56 and the modulating input of the frequency modulator 58. The counter 72 receives the index signal provided by the start index stripes 27, 28 and generates a high-level output at a count of two index pulses. The counter will remain at the same output state until it counts two index pulses provided by the end-of-scan index stripes 29, 30. Thus, the length of the output pulse from counter 72 is a representation of the time required during the electron beam to traverse the image area 26 for each horizontal trace. In the presence of the rectangular pulse from counter 72, the resettable integrator 75 increases its output voltage level. A monostable multivibrator 77 is shown connected to the counter 72 to detect the trailing edge of its output pulse to energize sample-and-hold circuit 76 to sample and hold the voltage signal delivered from the integrator 75. The trailing edge of the output of monostable 77 is then detected by monostable 78 to reset the integrator 75. Thus, the output of the scan period detector 59 is a step function voltage which is held at a level proportional to the line scan period of each line path until the end of each line scan.

The output of the detector 59 is used to modulate the frequency of the index signal delivered from the storage device 57. With this frequency modulation, the instantaneous frequency of the index signal is modified for each line scan to compensate for the difference in line scan period between different horizontal traces.

Since the indexing stripes 31 are positionally related to the phosphor stripes, accurate registration of the primary color signals with the phosphor stripes can be obtained by feeding the modified index signal to the phase shifter 53 in phase with the start index signal obtained at the beginning of each line scan from the index stripes 27 and 28. This phasing operation is achieved by a circuit including a variable delay line 73 and a phase detector 74. The latter detects the phase difference between the index signal delivered from the frequency modulator 58 and the start index signal delivered from the amplifier 56. The variable delay line 73 introduces a delay time proportional to the detected phase difference to the signal from the frequency modulator 58 and applies the delayed, frequency-modulated index signal to the phase shifter 53 which imparts phase shifts of 0°, 120° and 240° to the index signal as previously described.

Figure 6:
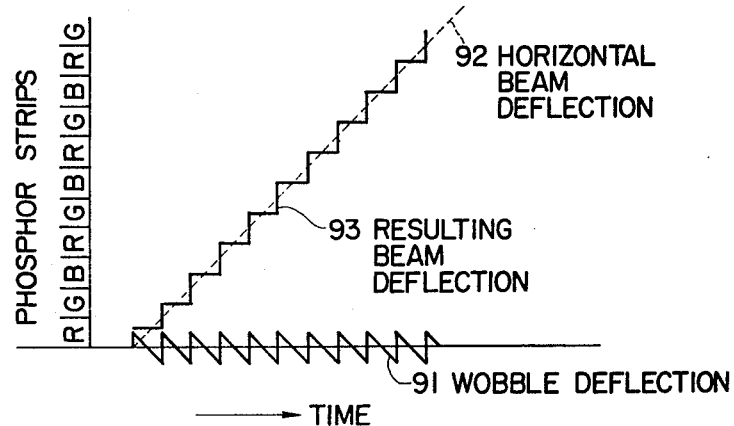
FIG. 6 is a graphic illustration of wobble deflection of electron beams.

According to another feature of the invention, a frequency multiplier 80 is connected to the variable delay line 73 to multiply the frequency of the phase-corrected indexing signal by a factor of three (which corresponds to the number of primary colors in each phosphor triplet). The frequency-multiplied signal is applied to the wobble deflection circuit 15 to convert it into a bipolar sawtooth waveform indicated at 91 in FIG. 6. The inclination of voltage slope of this sawtooth waveform is reverse to that of the waveform 92 of horizontal deflection. The electron beam will be oscillated horizontally at three times the triplet frequency by the width of a phosphor stripe by means of the wobble deflection plates 14 so that the impinging beam moves in a step-like fashion as indicated at 93. This wobble deflection causes the electron beam to stay in registry with the phosphor stripe over time and then rapidly shifts to the next so that the dwell time of the electrons on each phosphor stripe is longer than is available with the normal straight line scansion. This increases photon emission without increasing beam current. The wobble deflection may also be effected by a sinusoidal alternating waveform.

For the two-beam cathode ray tube of the invention, the electron beams 11' and 12' should be aligned at all times in a direction parallel to the length of the phosphor stripes and the beam spots should be spaced apart by an integral multiple of the width of a line path at all times so that the second beam 12' accurately impinges on the same spot of the stripe which has previously been bombarded by the first beam 11'. However, because of a possible error which may be introduced by the delay circuit 81, the second beam 12' will become out of alignment with the first beam 11'. For this reason the embodiment of FIG. 2 requires convergence control as conventionally employed in three-beam cathode ray tubes.

Figure 8:
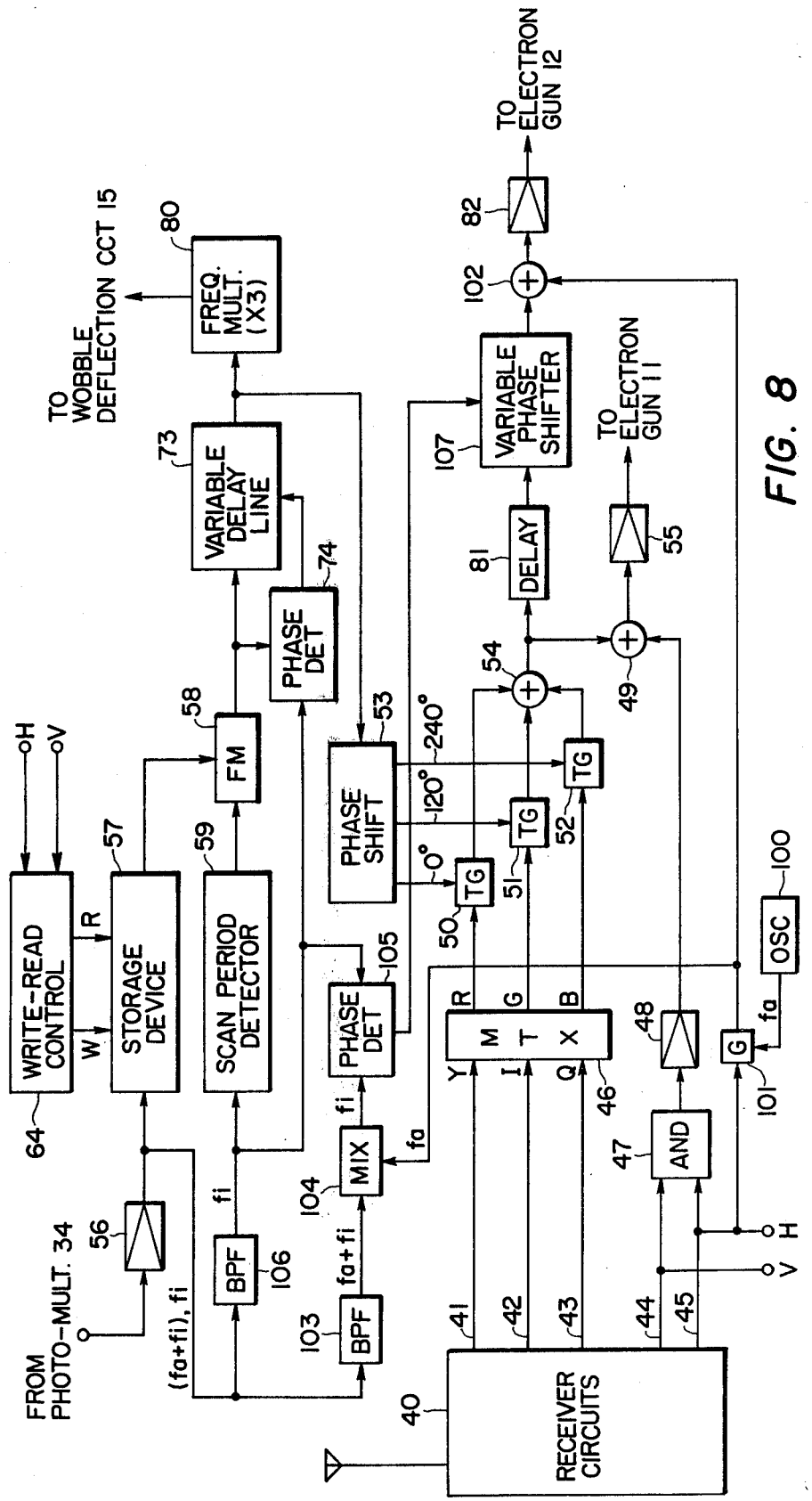
FIG. 8 is a modification of the embodiment of FIG. 2.

An embodiment shown in FIG. 8 is intended to eliminate the need for providing convergence control by modulating the second electron beam with a pilot signal and scanning the start index stripes 27, 28 with the modulated beam. In FIG. 8, the circuit blocks indicated by the same numerals as used in FIG. 2 function in the same manner as previously described and additional circuit blocks are indicated by numerals commencing at 100.

An oscillator 100 generates a signal at a frequency fa which is different from the fundamental frequency fi of the start index signal derived from the indexing stripes 27 and 28. The pilot signal is produced by a transmission gate 101 in response to a horizontal sync pulse. This pilot signal is a burst of frequency fa and inserted to the dot-sequential video signal at the start of each line scan through an adder 102. The video signal is applied from the delay circuit 81 to a variable phase shifter 107 whose output is coupled to the adder 102. The variable phase shifter 107 receives a phase control signal from a phase detector 105. The burst pilot signal is amplified at 82 and applied to the control electrode of the electron gun 12 to modulate the beam 12' with frequency fa. Scanning the start index stripes 27, 28 with the beam modulated at frequency fa results in a start index signal at frequencies (fa±fi). On the other hand, the impingement of the first beam on the stripes 27, 28 results in a start index signal whose frequency is fi. Therefore, the two start index signals can be easily discriminated from each other. A bandpass amplifier or filter 106 which is turned to the fundamental frequency fi of the index signal is connected to the amplifier 56 to select the first index signal fi and passes it to the scan line detector 59 and to the phase detector 74 for subsequent circuit operations as previously described and also to the phase detector 105. The second index signal is passed through a bandpass amplifier 103 which is tuned to a frequency fa+fi so that the upper sideband frequency of the second index signal is selected and applied to a mixer 104 where it is mixed with the burst signal supplied from the oscillator 100 via gate 101. The output of the mixer 104 is the frequency component fi of the second index signal which goes to the phase detector 105 for detection of the phase difference between the two signals. If there is any phase difference between the two electron beams, the variable phase shifter 107 will control the phase of the video signal applied to the second electron gun 12 in response to the output from phase detector 105 to compensate for the error introduced by the delay circuit 81.

FIG. 3B illustrates another embodiment of the phosphor target 20. In this illustration, the index electrode is formed by a single metal layer 110 which is serrated and provided on an insulative support 111. The phosphor stripes which form the image area are disposed on a metal layer 112 which is also disposed on the insulative support so that the metal layers 110 and 112 are coplanar with each other. The out-of-the image area of the metal layer 112 is serrated in a complementary manner to the serration of the metal layer 110 so as to cover the area of the insulative support which is not occupied by the metal layer 110. This prevents the accumulation of excessive negative charges between adjacent index stripes which might otherwise cause repulsion of the electrons impinging the index stripes, thereby diminishing the available amount of energy to be utilized as the index signal. The metal layer 110 is connected through a noise-suppression coil 113 to the voltage supply 33 and layer 112 is connected directly to the same voltage source. The coil 113 suppresses the noise which will be generated as a result of the beam scanning across the serrated regions of the layer 112. The index signal is derived from a capacitor 114 connected to the metal layer 110 or a suitable means which blocks off the high tension potential.

What is claimed is:
1. A color television receiving system comprising:
a surface having an image area on which an image is formed;
periodically repetitive groups of vertically oriented light emissive stripes for emission of different primary colors in response to electron impingement and positioned within said image area;
a plurality of first sensors located on said surface in a single horizontal row adjacent to but outside of said image area and positionally associated with said light emissive stripes;
a second sensor located on said surface extending vertically adjacent to but outside of said image area;
means for producing first and second substantially parallel electron beams;
deflection means for causing said electron beams to scan said surface horizontally along a plurality of line paths to form a raster on said surface, whereby first and second index signals are produced in response to the impingement of said electron beams upon said first and second sensors, respectively, said first index signal being indicative of nonlinearity which may be present in said deflection means and said second index signal being indicative of the start of each line scan;
storage circuit means for storing said first index signal for the interval of a raster;
storage circuit control means for writing said first index signal into storage locations of said storage circuit means at the start of each raster scan and retrieving the stored index signal at intervals in response to said second index signal;

phase detecting means for generating a signal representative of the difference in phase between said second index signal and said retrieved first index signal;

variable delay providing means responsive to said phase difference representative signal to introduce a delay to said retrieved index signal;

sampling means responsive to the output from said variable delay providing means for converting a received video signal into a dot-sequential primary color signal for modulating the intensity of said first and second electron beams; and second delay providing means for introducing an integral multiple of a line scan period to said dot-sequential primary color signal prior to the modulation of said second electron beam with said primary color signal.

2. A color television receiving system as claimed in claim 1, further comprising a third sensor located on said surface extending vertically adjacent to but outside of said image area opposite to said second sensor, said deflection means causing said electron beams to scan so that the beams impinge said third sensor subsequent to the impingement upon said light emissive stripes whereby a third index signal is produced in response to the impingement of said electron beams upon said third sensor, means responsive to said second and third index signals to generate a signal representative of the time it takes for the electron beams to move between said second and third sensors for each line scan, and means for modulating the frequency of said retrieved first index signal with said time representative signal.

3. A color television receiving system as claimed in claim 2, wherein said second and third sensors form part of said first sensors and each of said second and third sensors comprises a plurality of vertically oriented stripes of electron sensitive material horizontally spaced apart at equal spacing to the spacing between successive first sensors.

4. A color television receiving system as claimed in claim 3, wherein each of said first sensors is associated with each of said light emissive stripe groups.

5. A color television receiving system as claimed in claim 1, wherein said deflection means includes means for causing said electron beams to oscillate horizontally during each line scan so that the beam stays on each light emissive stripe longer than the time it takes to shift to the next stripe.

6. A color television receiving system as claimed in claim 5, wherein said beam oscillation means comprises a waveform generator connected to the output of said variable delay means to generate a bipolar oscillating waveform.

7. A color television receiving system as claimed in claim 6, wherein said bipolar oscillating waveform is a sawtooth wave of which the slope of inclination is reverse to that of a horizontal deflection waveform generated by said deflection means.

8. A color television receiving system as claimed in claim 1, further comprising amplifying means for amplifying the relative signal strength of said delayed dot-sequential signal and the non-delayed dot-sequential signal such that the total amount of photons emitted in response to the impingement of said first and second electron beams upon a given point of the light emissive stripe is maximized.

9. A color television receiving system as claimed in claim 1, wherein said second sensor comprises a plurality of horizontally equally spaced-apart vertically oriented stripes of electron sensitive material, whereby the second index signal has a predetermined fundamental frequency, further comprising:

means for generating a burst signal at a frequency differing from the fundamental frequency of the second index signal produced in response to the impingement of said first electron beam on said second sensors and modulating the intensity of said second electron beam therewith at the start of each line scan, whereby the second index signal produced in response to the impingement of said second electron beam on said second sensor is a modulation of said burst signal frequency with said fundamental frequency;

first bandpass filter means tuned to said fundamental frequency to select the second index signal produced in response to the impingement of said first electron beam on said second sensor;

second bandpass filter means tuned to to one of the upper and lower sidebands of the modulated frequency to select the second index signal produced in response to the impingement of said second electron beam on said second sensors;

mixer means for extracting the fundamental frequency component of the selected second index signal;

a second phase detecting means for detecting the difference in phase between the output of said first bandpass filter means and the output of said mixer means; and variable phase shifting means responsive to the output of said second phase detecting means for controlling the phase of said delayed dot-sequential signal so that the delayed dot-sequential signal is in phase with the non-delayed dot-sequential signal.

10. A color television receiving system as claimed in claim 1, wherein said surface is convexed, further comprising a concave mirror positioned to reflect the image on said convexed surface to a projection screen.

11. A cathode ray tube for projection television systems including a viewing screen, comprising:

means for producing an electron beam;

a convex surface on an opaque electrically conductive support, said surface having an image area on which an image is formed and adapted for connection to a positive potential for accelerating said electron beam;

an apertured, concave reflecting mirror positioned in face-to-face relationship with said convex surface to allow said electron beam to impinge on said convex surface through the aperture thereof, said conductive support being located adjacent said concave mirror remote from said electron beam producing means to reflect the image to said viewing screen;

periodically repetitive groups of vertically oriented, light emissive stripes positioned within said image area for emission of different primary colors in response to the impingement of said electron beam;

a plurality of first sensors formed of a material emissive of ultraviolet light in response to ˉlectron beam impingement and located on said conductive support in a single horizontal row adjacent to but outside of said image area and positionally associated with said light emissive stripes, each of said first sensors being formed into a stripe vertically extending to an associated light emissive stripe; and a second sensor formed of a material emissive of ultraviolet light in response to electron beam impingement and located on said conductive support extending vertically adjacent but outside of said image area, said second sensor being formed into stripes vertically extending to form part of said first sensors and horizontally equally spaced apart from each other.

12. A cathode ray tube for projection television systems including a viewing screen, comprising:

means for producing an electron beam;

a convex surface on an opaque support, said surface having an image area on which an image is formed;

periodically repetitive groups of vertically oriented, light emissive stripes positioned within said image area for emission of different primary colors in response to electron impingement;

a plurality of first sensors formed of a material emissive of secondary electrons with an emission ratio greater than unity and located on said surface in a single horizontal row adjacent to but outside of said image area and positionally associated with said light emissive stripes;

a second sensor formed of a material emissive of secondary electrons with an emission ratio greater than unity and located on said surface extending vertically adjacent but outside of said image area; and an apertured, concave reflecting mirror positioned in face-to-face relationship with said convex surface to allow said electron beam to impinge on said convex surface through the aperture thereof and reflect the image to said viewing screen.

13. A cathode ray tube for projection television systems including a viewing screen, comprising:

means for producing an electron beam;

a convex surface on an insulative support having an image area on which an image is formed;

an apertured, concave reflecting mirror positioned in face-to-face relationship with said convex surface to allow said electron beam to impinge on said convex surface through the aperture thereof, said insulative support being located adjacent said concave mirror remote from said electron beam producing means to reflect the image to said viewing screen;

a first conductive layer on said support within said image area and a second conductive layer on said support outside of said image area, said first and second layers being adapted for connection to a positive potential for accelerating said electron beam; and periodically repetitive groups of vertically oriented, light emissive stripes positioned on said first conductive layer for emission of different primary colors in response to the impingement of said electron beam;

said second conductive layer being serrated to form a plurality of first sensing elements in a single horizontal row adjacent said image area and positionally associated with said light emissive stripes and to form a second sensing element vertically extending along the length of said light emissive stripes adjacent said image area.

14. A cathode ray tube for projection television systems including a viewing screen, comprising:

a convex surface on an opaque support, said surface having an image area on which an image is formed;

periodically repetitive groups of vertically oriented, light emissive stripes positioned within said image area for emission of different primary colors in response to electron impingement;

a plurality of first sensors located on said surface in a single horizontal row adjacent but outside of said image area and positionally associated with said light emissive stripes;

a second sensor located on said surface extending vertically adjacent but outside of said image area;

means for producing first and second substantially parallel electron beams; and an apertured, concave reflecting mirror positioned in face-to-face relationship with said convex surface to allow said first and second electron beams to impinge on said convexed surface through the aperture thereof and reflect the image to said viewing screen.

15. A cathode ray tube as claimed in claim 14, wherein said first and second electron beams are vertically aligned to each other.

16. A cathode ray tube as claimed in claim 14, further comprising a pair of horizontally spaced beam deflecting electrodes adjacent to said electron beam producing means.

* * * * *